Dec. 17, 1963
M. DOUIS ETAL
3,114,608
METHODS OF PRODUCING IODINE-131
Filed April 13, 1961
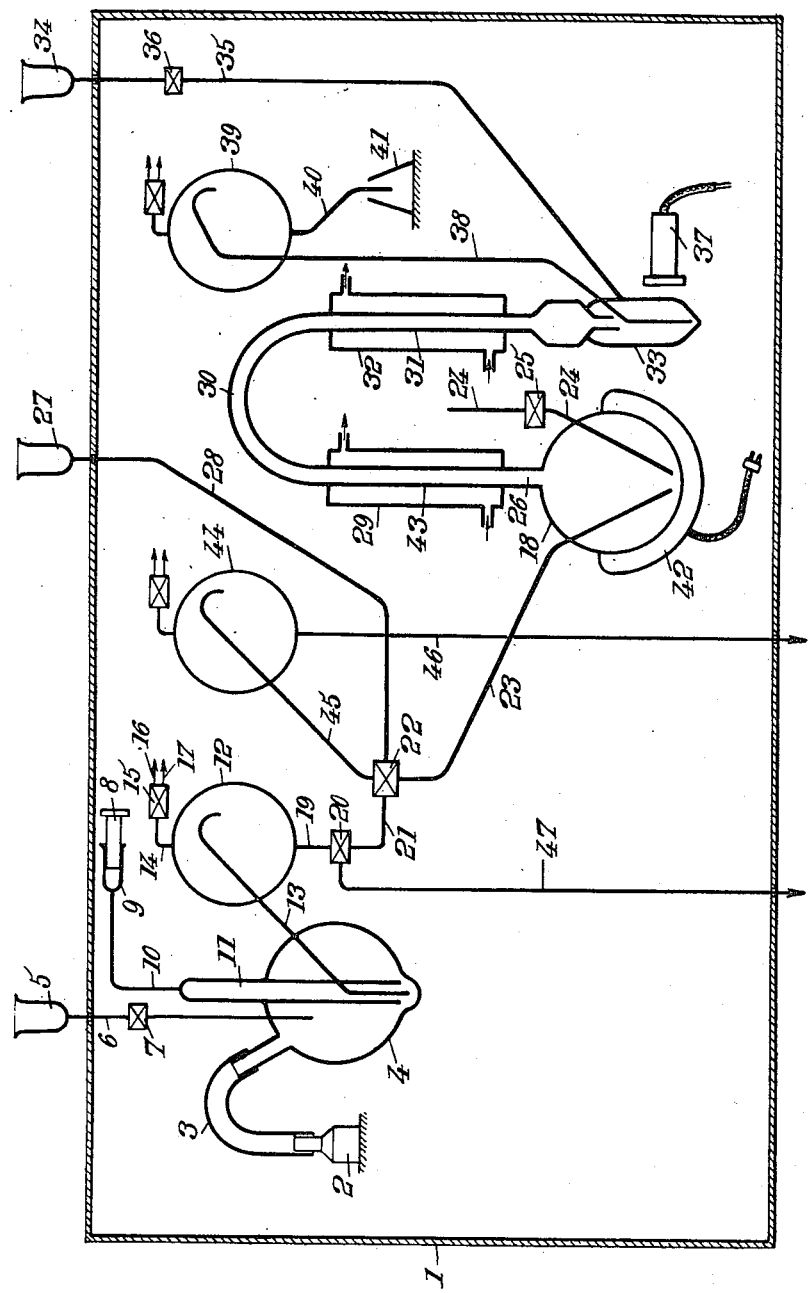
INVENTOR
BY
ATTORNEY

United States Patent Office 3,114,608
Patented Dec. 17, 1963

3,114,608
METHODS OF PRODUCING IODINE-131
Michel Douis, Maisons-Alfort, France, and Umberto Rosa, Turin, Italy, assignors to Commissariat à l'Energie Atomique, Paris, France
Filed Apr. 13, 1961, Ser. No. 102,863
Claims priority, application France Apr. 15, 1960
5 Claims. (Cl. 23—218)

The present invention relates to methods of producing iodine-131 by neutron irradiation of tellurium compounds and it is more especially concerned with methods of this kind in which iodine-131 is prepared from an oxigenated derivative of tellurium and in particular from tellurous anhydride.

The chief object of our invention is to produce a method of this kind which is better adapted to meet the requirements of practice than those known up to this time and in particular which permits of facilitating the irradiation of tellurium compounds and of separating the iodine-131 thus produced with a good yield, a high degree of purity and a high level of specific activity.

The invention consists essentially in irradiating tellurous anhydride by means of neutrons, dissolving the irradiated anhydride in an alkaline medium, in particular in sodium hydroxide, in such manner as to form a concentrated solution, that is to say a solution containing more than 5% by weight of alkaline tellurite, and oxidizing said solution by means of hydrogen peroxide in the presence of a suitable oxidation catalyst such in particular as sodium molybdate so as to transform the alkaline tellurite into a tellurate and in oxidizing the tellurate solution thus obtained so as to cause the iodine contained therein to pass into a volatile and distillable state without carrying along any substantial amount of detrimental impurities, iodine being easily recovered from this state.

It is known that one of the methods of preparing the radioactive isotope 131 of iodine is based upon a neutron reaction exerted on tellurium. It consists of a $(n, \gamma)$ capture on $Te^{130}$ with formation of $Te^{131}$ the $\beta$ decay of which leads to the formation of $I^{131}$ having a period of eight days, which is itself transformed by a $\beta$ decay into a stable isotope ($Xe^{131}$) of a rare gas, xenon.

The starting material of this preparation may be either elementary tellurium or a suitable chemical compound of tellurium.

The use of irradiated elementary tellurium is limited by the difficulty of extracting iodine-131 from this element.

On the contrary, use has often been made or telluric acid $H_2TeO_4, 2H_2O$ which is a well defined compound easy to obtain with a high degree of purity and having a well crystallized form. After irradiation, it is dissolved in water, acidified for instance by means of sulfuric acid and iodine-131 is distilled off. This method, which is very simple, permits of obtaining with good yields, preparations consisting chiefly of iodine-131, of good concentration and free from detrimental impurities.

But telluric acid, which is a solid crystalline substance at ordinary temperature, yields its two molecules of crystallization water (which may also be called constitution water since the formula $H_6TeO_6$ is often used to designate telluric acid) when heated at a temperature averaging 130° C. and it decomposes at a temperature of about 160° C., then yielding further amounts of water. This behaviour is often very disturbing because dehydration produces an aggregation which subsequently makes it impossible to withdraw the irradiated product from irradiation cans to subject it to the above mentioned chemical treatment. Decomposition makes dissolution and the subsequent treatment of the irradiated product more difficult.

The use of irradiated tellurous anhydride $TeO_2$ is interesting because this body is capable of undergoing higher temperatures than crystalline telluric acid. It is a solid product which sublimates at about 450° C. Furthermore, for the same volume, tellurous anhydride contains 1.4 more tellurium than crystalline telluric acid. These two properties are of great interest in the cases where a relatively high temperatures exists in the irridiation channels and where space is limited.

Another interesting advantage of the use of tellurous anhydride is the possibility of treating it in the conventional apparatus used for the treatment of irradiated telluric acid in order to separate iodine-131 therefrom. These apparatus are complicated and costly due to the necessity of working on substances which are highly radioactive and therefore must be placed inside protective shields.

Irradiated tellurous anhydride, in which iodine is present under valence states which are yet not well determined, is soluble in the cold state in aqueous solutions of alkaline hydroxide and soluble in the hot state in concentrated solutions of alkaline carbonate and in concentrated hydrochloric and sulfuric acids.

As a matter of fact, for the extraction of iodine-131 only the dissolution in an alkaline medium is of interest because it is the only case where there is no loss of iodine. This is due to the fact that, in the anhydride solutions obtained in the cold state from a solution of alkaline hydroxide, tellurium is present in the form of alkaline tellurite and iodine in the form of a mixture of alkaline iodide and alkaline iodate which are non volatile products, that is to say cannot escape by distillation.

Tellurous anhydride $TeO_2$ is more soluble at ordinary temperature in aqueous solutions of sodium hydroxide than in aqueous solutions of potassium hydroxide of the same concentration. For instance, a solution of sodium hydroxide of a concentration of 10% by weight (this concentration being chosen because it does not produce too great an attack of the glass apparatus where the dissolution operation is effected) is capable of dissolving up to 270 grs. of $TeO_2$ per liter, whereas a 10% solution of potassium hydroxide is capable of dissolving only 90 grs. per liter at ordinary temperature.

When the dissolution of irradiated $TeO_2$ has taken place, it is necessary to acidify the solution to permit of recovering iodine by distillation.

But if the solution of sodium tellurite obtained by dissolution of $TeO_2$ in an aqueous solution of caustic soda is directly acidified, for instance by addition of sulfuric acid, there is produced tellurous acid $H_2TeO_3$ in solution which is an unstable product which decomposes into $TeO_2$ which is little soluble and precipitates. Such a direct acidification has already been proposed but it can be effected for practical purposes only with highly diluted solution of tellurite and therefore in apparatus of prohibitive dimensions.

In order to avoid this drawback, according to our invention, the alkaline tellurite is oxidized to transform it into an alkaline tellurate before performing the acidifying operation which will lead to the obtainment of telluric acid in a sulfuric solution. The conditions are then the same as those obtained in methods where telluric acid is irradiated.

This oxidation of tellurite into tellurate must be performed in a basic medium (to avoid losses of iodine) without formation of a precipitate (which would make the operations difficult or impossible) and in a solution as concentrated as possible (to reduce the dimensions of the apparatus and to permit good yields under conditions as economical as possible).

Furthermore, the reagents used to produce such an oxidation must not introduce detrimental volatile products which would pass together with iodine during the final distillation.

For these various reasons, the oxidizing agent is hydrogen peroxide but the great instability of the alkaline solution of tellurite makes the oxidizing operation rather delicate. It is only in a highly diluted solution that the oxidation $TeO_3^{++}$-$TeO_4^{++}$ could take place without drawback. When acting upon solutions where $TeO_2$ is at a concentration higher than 5% and preferably higher than 7% by weight, there is formed an abundant precipitate which is difficult to dissolve again and consisting of $TeO_2$, $TeO_3$ or an addition compound $2TeO_2$, $TeO_3$. It is then nearly impossible to work inside a protective shield, the access to which is very difficult.

It has been discovered that a suitable oxidation catalyst makes it possible to accelerate oxidizing by means of hydrogen peroxide and thus facilitates the reaction by which tellurites are transformed into tellurates while avoiding a decomposition of the solution with the formation of precipitates despite a high concentration of $TeO_2$.

As above stated concerning the choice of the oxidizing agent, the catalyst must leave practically no trace of volatile compound which would subsequently be distilled off together with iodine. We have been led to use a molybdenum compound and preferably crystallized pure sodium molybdate $Na_2MoO_4$ which forms with iodine, in an alkaline medium, an iodomolybdic complex compound non stable in an acid medium. This last mentioned characteristic has the same effect as the stability of the mixture of iodide and iodate in an alkaline medium thus avoiding any risk of loss of iodine by volatilization before the acidifying operation.

Other compounds such as potassium molybdate or alkaline vanadates might also be used as oxidation catalysts but sodium molybdate, which gives excellent results, has finally been retained for practical purposes. After a distillation of iodine-131, a spectographic check up showed that the amounts of molybdenum that had been carried along corresponded to an amount lower than 1 microgram per milliliter of final solution of iodine.

According to the invention, after the tellurites have been oxidized into tellurates, the solution is acidified, for instance by means of sulfuric acid, before performing the distillation of iodine. It is known that the pH of the solution plays an important part for the extraction of iodine. A 6–8 N sulfuric acidity corresponds to the best conditions. It is also known that the speed of distillation of iodine may be strongly increased by adding bodies which facilitate the evolution of the $IO_3^-$ and $I^-$ system toward the $I°$ form, that is to say the reduction of the iodates and the oxidation of the iodides into elementary iodine which is the only one that can be distilled off. These bodies consist of ordinary sodium iodide and sodium iodate in suitable concentration.

We will now describe with reference to the appended drawing an embodiment of the invention.

The only FIGURE diagrammatically shows the essential portions of an apparatus for the dissolution of irradiated tellurous anhydride, the oxidizing operation and the distillation of the solution thus obtained, according to the invention.

In one of the channels of a nuclear reactor we irradiate 200 grs. of tellurous anhydride $TeO_2$, for twelve days in a neutron flux ranging from $5 \times 10^{12}$ to $10^{13}$ neutrons per square centimeter and per second. The product thus irradiated is then withdrawn from the reactor in the gastight can where it had been placed before irradiation and it is conveyed, with due precaution required by the high radioactivity of the preparation, into the treatment apparatus. This apparatus is surrounded by a protective shield diagrammatically illustrated at 1.

The can is then opened and after its opening the contents of said can 2 are passed through a flexible tube 3, by gravity, into a glass container 4 of a volume of about 3 liters. A funnel 5 placed on the outside of shield 1 makes it possible to introduce into container 4, through a conduit 6 provided with a cock 7, one liter of an aqueous solution of sodium hydroxide of a concentration of 10% by weight. The dissolution of the 200 grs. of irradiated $TeO_2$ then takes place at ordinary temperature in this alkaline solution stirred by a system of hydraulic pulses. For this purpose, a piston 8 driven by a suitable motor reciprocates in a cylinder 9 communicating through a conduit 10 with a kind of bell 11 open at its lower end, which is immeresed in the liquid present in conatiner 4. The alkaline solution is stirred by the continuous pressure alternations produced in the gaseous atmosphere existing in cylinder 9, conduit 10 and the top of bell 11.

Funnel 5 is then used to introduce, into container 4, 40 μg. of an aqueous solution of sodium iodate (2 ml.).

It is preferable to add the oxidation catalyst consisting of sodium molybdate at the time of dissolution because the stability of the iodo-molybdic complex in an alkaline solution may prevent a substantial loss of iodine at this time. We therefore introduce into container 4, by means of funnel 5, 10 ml. of an aqueous solution containing 1 gr. of pure crystalline $Na_2MoO_4$.

The clear alkaline solution is then passed from container 4 to a siphon sphere 12 of suitable volume and into the top of which opens a conduit 13 communicating with the bottom portion of container 4. A conduit 14 opening at the top of sphere 12 is in communication with a source of vacuum through a three-way cock 15 and a conduit 16, cock 7 being advantageously opened during this operation, and then closed. A conduit 17 connected with the third outlet of cock 15 permits of producing in sphere 12 a small suction (about 200 mm. of water) with respect to the pressure inside shield 1.

The alkaline solution is transferred from sphere 12 into a glass container 18 of a volume of 3 liters through a conduit 19 starting from the bottom of sphere 12 a three-way cock 20, a conduit 21, a four-way cock 22 and a conduit 23 opening into the bottom part of container 18. Container 4 and sphere 12 may be washed by means of a sodium alkaline solution to transfer the whole of the activity to container 18. A conduit 47 connected with one of the outlets of cock 20 permits of evacuating to the outside of shield 1 the effluents resulting from these washing operations.

The alkaline solution being thus collected in container 18, it is slightly stirred by passing therethrough a small stream of gaseous nitrogen supplied from an external source to which is connected a conduit 24 provided with a cock 25 and which opens into the bottom part of container 18. This nitrogen issues from container 18 through a conduit 26 starting from the top thereof and flows out through the outlet of this conduit 26, where the iodine solution will be collected, as hereinafter explained.

In the alkaline solution thus slightly stirred we introduce 120 ml. of pure hydrogen peroxide at 110 volumes from a funnel 27 placed on the outside of shield 1 and through conduit 28, four-way cock 22 and conduit 23. The oxidation reaction (in the presence of the sodium molybdate catalyst present in the alkaline solution) then takes place. When it is practically finished, which will require some minutes at ordinary temperature, and without cutting off the nitrogen stream, we introduce into container 18, from funnel 27, sulfuric acid of 36° Baumé concentration, the amount of this acid being sufficient to give the tellurate solution a 6 N normality in sulfuric acid, this being the best possible concentration for the subsequent distillation of iodine.

We then introduce, still in the same manner, 3 ml. of an aqueous solution containing 270 micrograms of sodium iodide.

Without cutting off the flow of nitrogen, we heat the contents of container 18 by means of an electrical heating device 24. Tube 26, which starts at the top of container 18, communicates with an upward cooling tube 43 provided with Vigreux points, surrounded by a cooling sleeve 29 through which refrigerated liquid is flowing. The solution, vaporized by heating, condenses in tube 23 and returns into container 18. After about one hour, practically the whole of the iodine has passed into the elementary state where it is distillable.

The stream of nitrogen is then cut off and tube 43 is no longer cooled. Under the effect of the heating of container 18, iodine and a small amount of water distills off and flows through tube 43 and a semicircular conduit 30 to a downward directed cooling tube 31 surrounded by a cooling sleeve 32. Iodine thus distilled and condensed is collected by gravity in a container 33 where we have introduced, by means of an external funnel 34 and through a conduit 35 provided with a cock 36, 10 ml. of an aqueous solution (pH from 8 to 9) of sodium bicarbonate-sodium carbonate-sodium thio-sulfate serving to trap the iodine.

Distillation is stopped when the volume of iodine solution passed from container 18 into bottle 33 is equal to 70 ml.

The distillation operation is checked up by means of an ionization chamber 37 located close to bottle 33. It is thus found that from 3 to 6 curies of iodine-131 are collected, the specific activity of the final solution being as high as 80 mc./ml., which corresponds to a yield of about 90%.

The solution of iodine-131 is conveyed through a conduit 38 starting from the top portion of bottle 33 and leading to a siphon sphere 39 provided with suction and discharge means identical to those above described with reference to sphere 12.

A conduit 40 permits of evacuating by gravity said solution into a container 41 where iodine is stored.

The solution remaining in container 18 after distillation of iodine-131 is sucked out by means of a siphon sphere 44 analogous to sphere 12 through a conduit 23, a four-way cock 22 and a conduit 45 opening into the top portion of said sphere 44. This solution is then sent through a conduit 46 to an installation located on the outside of shield 1 for the treatment of the effluents.

The whole of the dissolution and distillation apparatus is placed inside a gastight Plexiglas bell (not shown) provided inside shield 1 and where the pressure is slightly smaller than that of the external atmosphere. The active carbon traps (not shown) are inserted in the venting circuits of this bell.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A method of producing iodine-131 which comprises irradiating tellurous anhydride by means of neutrons, dissolving the irradiated anhydride in an alkaline medium to form a solution of alkaline tellurite, concentrating this solution so that it contains more than 5 percent by weight of tellurite, oxidizing it by means of hydrogen peroxide in the presence of an oxidation catalyst selected from the group consisting of alkali metal molybdates and alkali metal vanadates to transform this tellurite into tellurate, acidifying the solution, and distilling to recover iodine.

2. A method according to claim 1 and in which the alkaline medium is sodium hydroxide.

3. A method according to claim 1 wherein the oxidation catalyst consists of sodium molybdate.

4. A method of producing iodine-131 which comprises irradiating tellurous anhydride by means of neutrons, dissolving the irradiated anhydride in an alkaline medium to form a solution of alkaline tellurite, concentrating this solution so that it contains more than 5 percent by weight of tellurite, oxidizing it by means of hydrogen peroxide in the presence of an oxidation catalyst selected from the group consisting of alkali metal molybdates and alkali metal vanadates to transform said tellurite into tellurate, acidifying the solution, and distilling to recover iodine, the above mentioned steps being performed in the presence of an inert gas.

5. A method according to claim 4 wherein said inert gas is nitrogen.

References Cited in the file of this patent
UNITED STATES PATENTS
2,994,577    Silverman _____ Aug. 1, 1961